United States Patent [19]

Klingman, III

[11] 4,081,669
[45] Mar. 28, 1978

[54] RECOGNITION SYSTEM FOR CLASS II ROBOTS

[76] Inventor: Edwin E. Klingman, III, 950 N. San Antonio Rd., Apt. 6B, Los Altos, Calif. 94022

[21] Appl. No.: 659,829

[22] Filed: Feb. 20, 1976

Related U.S. Application Data

[63] Continuation-in-part of Ser. No. 409,989, Oct. 26, 1973.

[51] Int. Cl.² .............................................. H04B 9/00
[52] U.S. Cl. .................................... 250/199; 356/152; 343/106 R
[58] Field of Search ........................ 250/199; 356/152; 343/106 R, 102, 113 R; 340/16 R, 25

[56] References Cited

U.S. PATENT DOCUMENTS

| | | | |
|---|---|---|---|
| 3,697,941 | 10/1972 | Christ | 250/199 |
| 3,704,070 | 11/1972 | Johnson et al. | 250/199 |
| 3,799,675 | 3/1974 | Johnson et al. | 250/199 |

OTHER PUBLICATIONS

"Consol", *Wireless World*, July, 1946, pp. 233-235.

*Primary Examiner*—Richard Murray
*Attorney, Agent, or Firm*—G. J. Porter; L. D. Wofford, Jr.; J. R. Manning

[57] ABSTRACT

A recognition system for robots is responsive to encoded information from a plurality of sources for enabling a robot to recognize and identify the sources. A receiver located on the robot detects incoming signals and decodes them. The decoded signal is compared with information stored in the robot memory to provide source identification. A direction determining sub-system incorporated into the receiver provides source direction information. The system may utilize either digital or analog techniques.

10 Claims, 4 Drawing Figures

BRIEF DESCRIPTION OF THE DRAWINGS

These and other objects, advantages and novel features of the present invention will become apparent as the same becomes more fully understood by reference to the following detailed description when considered in conjunction with the accompanying drawings, in which like reference numerals designate like parts throughout the figures thereof and wherein.

DESCRIPTION OF THE PREFERRED EMBODIMENTS

Figure 1:
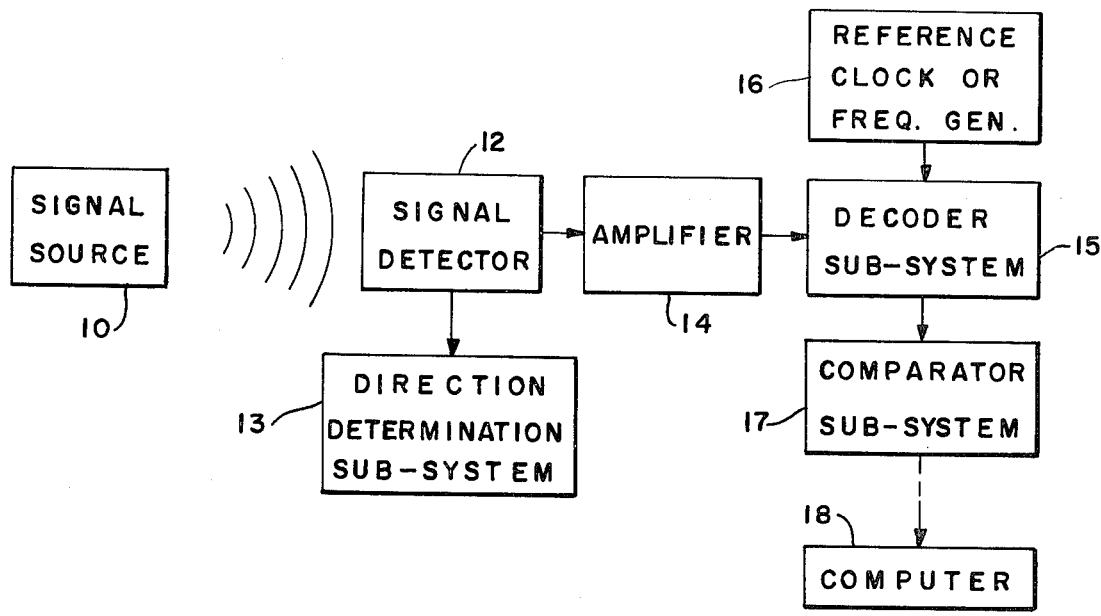
FIG. 1 shows a generalized functional block diagram of the system of the invention showing a single object.

Referring to FIG. 1, a signal source 10 is associated with and disposed adjacent to an object and/or location to be recognized by a robot. Source 10 emits an omnidirectional signal 11 characteristic of the specific object or location or a specific class of objects or locations with which the source is associated. In the broadest sense of the invention, any source capable of emotting a detectable and decodable signal can be used. However, the preferred type of signal is light (ultra-violet, visible or infrared).

Disposed on the robot is a signal detector 12 for receiving the signals from source 10. The signals are sent to a direction determination sub-system 13, and to a decoder subsystem 15 via an optional amplifier 14. A reference clock or frequence generator 16 provides timing pulses to the decoder sub-system. The output of the decoder sub-system 15 is sent to a comparator sub-system 17. The results of the comparisons in sub-system 17 is sent to utilization device designated as computer 18.

The system operates as follows. Signals from each source associated with the respective objects in the environment in which the robot is to operate, are coded in a way to make the source (and its associated object) identifiable from other similar sources. While numerous means of coding can be used, the preferred coding utilizes frequency or pulse rate encoding. For example, the objects may be numbered serially and the code associated with an object could be its number. Thus, the source associated with object 7 would transmit the code word 0111, for example, allowing this object to be distinguished from, for example, object 6, whose code word would be 0101. The source associated with an object would thus provide a train of light pulses coded according to the number of the object.

The light signals from the source associated with an object within the field of view of signal detector 12 of the robot are received by the detector and converted into electrical signals. After amplification, these electrical signal are furnished to the decoder sub-system 15 which extracts the code from the signal. When the code is the number of the object, the output of sub-system 15 is the number. The comparator sub-system 17 has codes (e.g., numbers) stored therein corresponding to the various source codes. The decoded information furnished by sub-system 15 is compared with the stored codes. If a match occurs, a signal is sent to computer 18 indicating the source has been identified. Computer 18 may contain in its memory, instructions for the robot to carry out when certain objects are identified, and in such case, identification of an object would cause the computer to issue a predetermined command to the robot.

The set of coded words against which the incoming decoded information is to be matched can be stored and/or generated from current state plus past history. Information in storage need not consist of fixed words corresponding to known objects or locations, but can consist of a recognition algorithm capable of pro-essing the information into unsable form.

The light signals received at detector 12 are also responded to by directional determination sub-system 13 whose function is to establish the direction of the source (and hence, the object with which it is associated) relative to the robot. Sub-system 13 may be in the form described in the paper entitled "Implementation of a Frog's Eye Type Discriminator, Responsive only to Pattern Changes, as a Preprocessor for Visual Data" distributed by the present applicant at the 19th Annual Testimonial of the Institute of Environmental Sciences meeting on "Realism in Environmental Testing and Control" at Anaheim, Cal. on Apr. 2, 1973, which paper is hereby incorporated by reference. The essence of the system disclosed in this paper lies in the extraction of information from scanning signals that scan the cells of a photo array constituting detector 12. This positional information is used to synchronize an information processor, normally a computer operating in the interrupt mode, allowing the ordered storage of signals from the cells of the photo array. This ordered information is then analyzed to extract the positional information concerning the image of the target which has been focussed on a sub-set of the cellular array via a mask, slit or other optical imaging sub-system.

Figure 2:
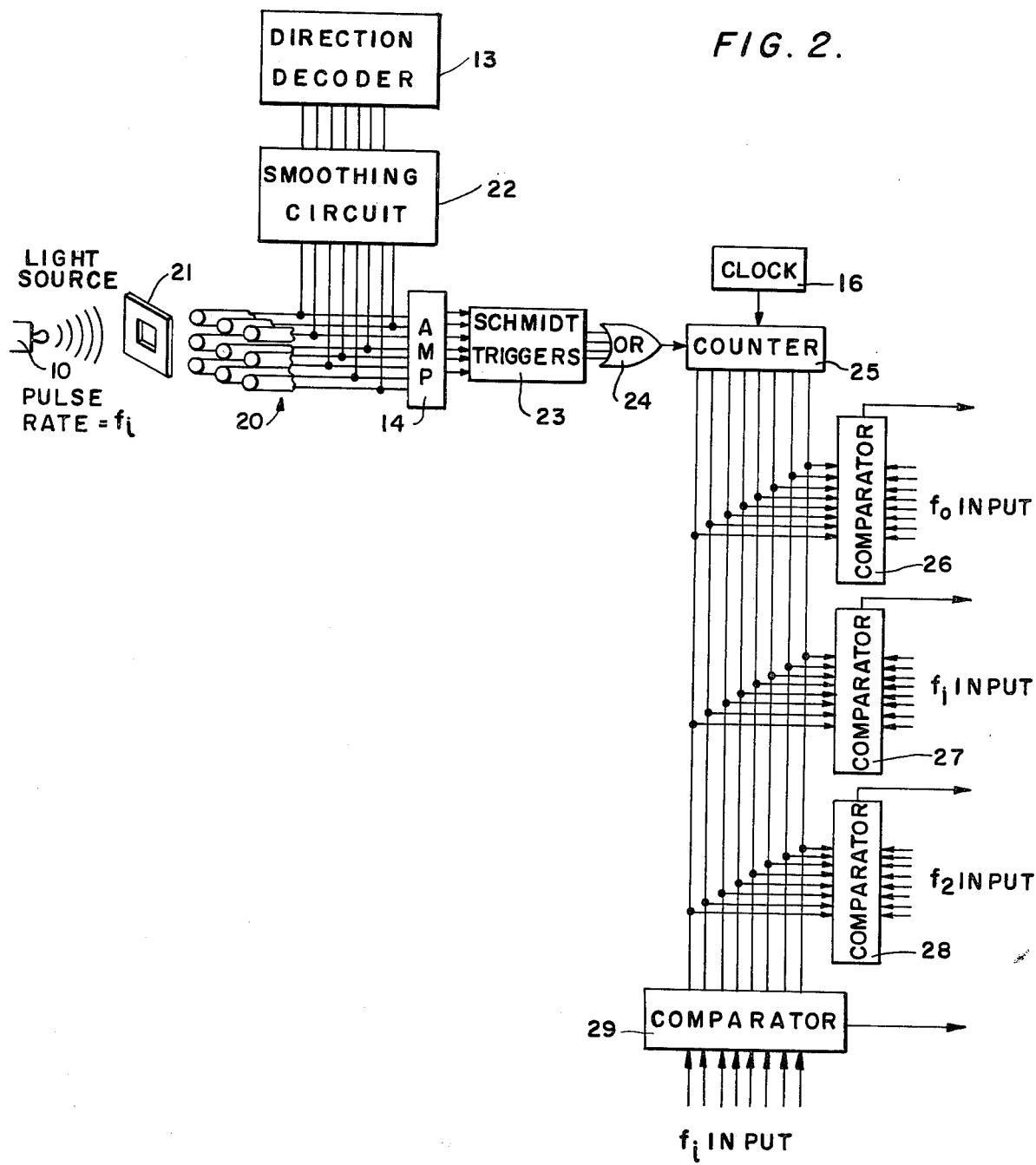
FIG. 2 shows a digital implementation of the system.

FIG. 2 shows a digital implementation of the general system of FIG. 1 in which the detector is in the form of a cellular array of photocells. The light source 10 is one of a plurality of pulse rate coded sources at various locations or on various objects within a selected environment. A photodetector array 20 on the robot receives the light signal from the source through an aperture in mask 21. The mask and photodetector array arrangement provides direction information which is sent to smoothing circuit 22 and direction decoder 13. The photodetector array output is also passed through amplifier 14 to a plurality of Schmidt triggers 23, there being one Schmidt trigger for each photodetector in array 20. The pulses produced by the photodetectors turn on the Schmidt triggers so that for every pulse received by circuit 23, a standard pulse of predetermined amplitude and pulse width is produced and fed to OR circuit 24. A pulse from any one or more of the Schmidt triggers enables the OR circuit to send a pulse to counter 25. The OR circuit is used because of the possibility, or probability, that more than one photodetector of the array 20 will detect a particular pulse of light and produce an electrical pulse in response thereto. Therefore, a plurality of pulses may be processed simultaneously, each representing the same light pulse. The OR circuit receives these pulses simultaneously and emits one pulse in response to them.

The pulse train from the OR circuit is sent to counter 25. The counter is gated on and reset with timing pulses provided by clock 16. This occurs periodically and during each time period the counter counts the number of pulses received from OR circuit 24. At the end of each period, the binary count is compared to the stored

RECOGNITION SYSTEM FOR CLASS II ROBOTS

ORIGIN OF THE INVENTION

The invention described herein was made by an employee of the United States Government and may be manufactured and used by or for the Government for governmental purposes without the payment of any royalties thereon or therefor.

This application is a continuation-in-part of copending application Ser. No. 409,989 filed Oct. 26, 1973.

BACKGROUND OF THE INVENTION

The present invention relates generally to the field of recognition systems and more particularly to systems which permit a robot to identify and locate objects in the environment of the robot.

The most commonly used techniques in the prior art for robot control include radio or cable control, totally determined programming, and pattern recognition. The disadvantage of radio control for recognition purposes lies in the difficulty of determining the location of a radio source with the required degree of precision. This is true of radar, transponders, fixed sources, or any other means of radio communication. Neither radio control nor cable control lend themselves well to meeting the demands of automatic control.

Totally determined programming denotes the case in which the robot has a map of the world in storage and keeps track of its own changing position on this map. It has the disadvantage that acceptable precision requires vast of data storage and manipulation. By contrast the present invention allows the use of a gross world map supplemented by the recognizable beacons thereby minimizing the storage and computation required. The ability to sequence these responses provides for environmental control of certain robot behavior which greatly diminishes the demands imposed by autonomous control.

Attempts at pattern recognition of the passive environment (i.e., an information sense, not a kinetic sense) are well documented and although an enormous amount of work has been done is this area, no real success has been achieved at any non-trivial, non-contrived tasks. These attempts view a passive environment through video detectors of various kinds and attempt to geometrically analyze the environment.

In general, the state of the art prior to the present invention was in a primitive state making all but the simplest operations impossible and requiring complex and/or lengthy computation.

SUMMARY OF THE INVENTION

Class II robots are those which function in a designed environment. For example, an aircraft on automatic control following a flight plan defined by the location of ground-based transponder stations would be a Class II robot. On the other hand, Class I robots function in unknown environments. An unmanned space probe is an example of a Class I robot. Thus, for Class II robots, the possibility exists for the robot to recognize the environment through proper design of the environment.

The general purpose of the present invention is to provide a recognition system for a Class II robot which has many advantages and none of the disadvantages of prior art devices noted above. To attain this, the present invention provides a system for enabling a Class II robot recognize, identify and locate individual ones of a plurality of objects in an enviornment. The system includes a signal transmitter associated with each object to be recognized for transmitting a coded light signal that is unique to each object enabling it to be identified, and a receiver on the robot to decode the light signal and identify the object. Preferably, the light signals are infrared, visible, or ultraviolet light coded by variations in frequency or pulse rate. The light signals are picked up by an array of photodetectors and converted to electrical signals for determining the direction of the object in relation to the robot. The electrical signals may be decoded, either digitally or by analog means.

The present invention provides robots with the ability to recognize "visually" certain objects and/or locations with which it is "familiar." The simplicity inherent in the invention allows easy application to practical situations which occur in robot usage. The ease of implementation is due primarily to the conceptual and computational simplicity of the system based on active environmental participation. This also results in great flexibility and economy since a low cost, simple active environmental recognition system substitutes for the expensive and complex computational and storage equipment required for passive recognition systems. Since prior art recognition systems are primarily geometrical and analytical in their implementation, they are of necessity slower than the system of the present invention which preprocesses the incoming data and extracts the needed information, sending only this data to the control processor rather than all of the irrelevant geometrical information about the environment. For these reasons, the present system is capable of vastly more complex robot behavior than are prior art systems.

The present invention facilitates a distributed computer network with several recognition systems simultaneously functioning and sending the extracted information to a higher-level processor in which the worl map and other information as to system goals are stored. This higher-level computer then decides upon a course of action or simply relinquishes control to the environment. The higher-level computer may also update the recognition system as required. This multi-level computer concept permits the operation of several robot extensions simultaneously under control of localized recognition systems on each extension. This task is impossible with prior art systems in which a central processor exercises complete control and hence cannot perform two complex operations simultaneously. When time consuming geometrical analyses are considered, even nearly simultaneous operation is precluded by the prior art.

Therefore, it is an object of the present invention to provide a robot recognition system which is inexpensive, simple, and capable of extremely complex behavior.

Another object of the present invention is to provide a robot recognition system which utilizes active environmental participation to provide positive identification of objects and/or locations with no geometrical analysis and a minimum of computation.

A further object of the invention is to provide a robot recognition system in which the robot can be locally controlled by the environment through sequencing the signals to control robot extensions through complex behavioral repertoires.

binary words and the counter is reset to begin counting for another period. Comparators 26, 27, 28, 29 compare each count with stored data received from the robot computer. For example, comparator 26 has two sets of inputs; one specified "ƒo" being a representation of the count from one of the possible objects in the environment, and the other input being the binary count from the counter 25. An output from comparator 26 means that correspondence exists thus causing the object to be identified.

The stored data may be hardwired into the comparison system for simple situations. For more complex cases, the past history of the robot combined with its current state can be algorithmically used to generate the recognition code against which the decoded incoming signal information is to be matched. In either event, when a match occurs, the comparator having the matched data outputs a pulse to the computer indicating that the source has been recognized. The identity of the source is specified by the particular comparator which sends the match pulse to the computer.

Figure 3:
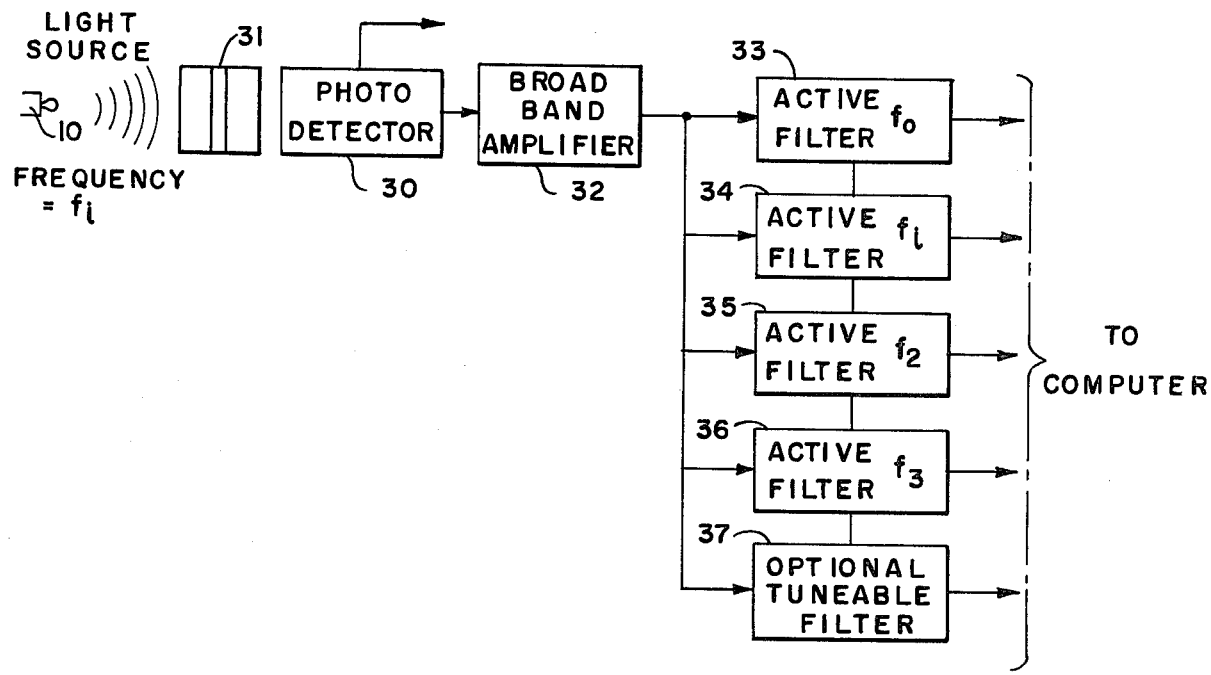
FIG. 3 shows a analog implementation of the system.

FIG. 3 shows an analog implementation of the general system of FIG. 1. The source 10 is the same as in the other embodiments. The light from source 10 impinges on detector 30 through a slit in mask 31. Detector 30 can be a bridge or array type directional photodetector which, together with mask 31, allows for the derivation of directional information. The detector output is sent to a direction determination subsystem (not shown) and to broad-band amplifier 32. A plurality of narrow tuned active filter circuits 33, 34, 35, 36 and 37 receive the signal from amplifier 32 and pass the signal only if its frequency or pulse rate is within the narrow passband of one of the filters. Each filter output serves to identify the frequency passed by the filter. If the frequency of the received signal is within one of the narrow passbands of a filter, it is passed to the robot computer thus identifying the object with which source 10 is associated.

The direction determination sub-system may also be based on the coordinate computation technique presently being used in so-called "gamma cameras" of the type illustrated in U.S.Pat. No. 3,011,057 issued to Hal O. Anger. In this patent, whose disclosure is hereby incorporated by reference, an array of photomultipliers arranged in a hexagonal patter, is capable of computing the two coordinates of a spot of light located anywhere within the projected area of the photomultipliers.

Figure 4:
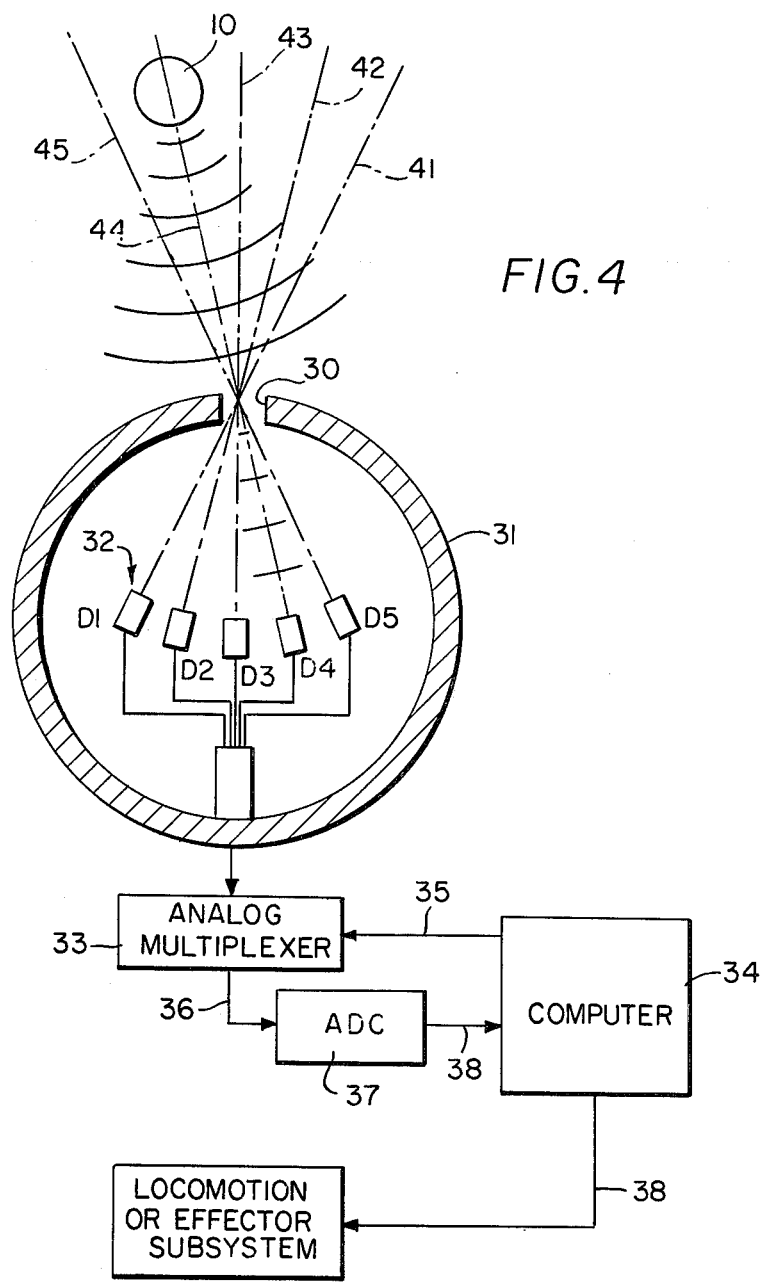
FIG. 4 is a schematic block diagram of a direction determination sub-system suitable for use with the invention as shown in FIGS. 1 and 2.

A further direction determination sub-system is illustrated in FIG. 4 which shows omnidirectional light signals from object 10 entering a pinhole 30 of a physical mask/aperture apparatus 31 containing a two-dimensional array of photodetectors. For convenience in illustrating the invention, the array 32 is linear and has five photodetectors designated D1 – D5. The output of each photodetector in array 32 is sampled at a rate much higher than the modulation period of the coded light signal produced by source 10, the sample taking place in multiplexer unit 33 under the control of computer 34 by means of control lines 35. The analog signal from the selected detector is applied by line 36 to an analog-digital converter 37 whose output is applied by lines 38 to computer 34. Once object identification and position information is obtained by computer 34, a command signal can be sent via line 38 to a locomotion or effector sub-system in the robot. For example, the command signal may be such as to cause the robot to home on the object.

The direction of the object with respect to the axis of the apparatus 31 determines which of the individual photodetectors of array 32 is illuminated. In FIG. 4, detector D4 is shown as being illuminated; and it should be understood that, while a one-dimensional array of photodetectors is shown, the drawings is illustrative of a two-dimensional array.

The modulation imposed on the light signal by source 10 results in periods during which photodetector D4 is not activated above whatever background levels are present even though this detector is still aligned with the light source 10. The alternating light and dark periods will produce signatures characteristic of the modulation when the photodetector array is scanned during the sampling by multiplexer 33. Thus, each source can be uniquely identified by reason of the unique modulation wave form assigned to it.

A measure of the distance from the detector to the object may be obtained by analyzing the intensity of the detected signal which is digitized by the analog-to-digital converter and made available to the computer. Intensity, it will be recalled, is proportional to the square of the distance to the object.

The direction determination sub-system shown in FIG. 4 functions as follows. The photodetector array is scanned and the output from each detector is recorded. The detector having the highest output is used to establish the direction to the object in terms of the directional axes A1–a5 shown in FIG. 4 wherein axis A1 is associated with detector D1, etc. Because the binary coded signatures of each of the sources can be distinguished easily, the identity of the object can be determined by reason of the decoded modulation imposed on the signal, and the approximate distance to the object can be determined from intensity measurements from the photodetectors. All of the above functions may be implemented with a computer as indicated in the drawing, or with standard integrated circuits. The fixed geometry allows precalculation of the directional axis associated with each photodetector, thereby minimizing directional calculations. This scheme allows the robot to approach the desired object via a simple algorithm. The robot also can determine its location by triangulating on recognized (i.e., fixed) objects using directional information and/or relative intensity at received signals from different sources. This ability drastically reduces the requirements of the "world map" by which the robot keeps track of its position.

The identifying modulations associated with each object drastically reduce the pattern recognition capabilities normally associated with the task of visually locating objects.

Obviously, many modifications and variations of the present invention are possible in light of the above teachings. For example, means of coding other than frequency or pulse rate can be used. This includes, but is not limited to, color, time, or any standard code in common use in communications. Analog or digital means of decoding any chosen code scheme can be used. It is therefore to be understood that, within the scope of the appended claims, the invention may be practiced otherwise than as specifically described.

What is claimed is:

1. A system for enabling a Class II robot to recognize, identify and locate individula ones of plurality of objects in an environment comprising:

(a) a transmitter physically adjacent each object for transmitting a coded signal that is unique for each object enabling it to be identified;
(b) a receiver in the vicinity of the objects;
(c) decoding means at the receiver responsive to a coded signal from an object for decoding the signal and identifying the object; and
(d) locating means at the receiver responsive to the spatial position of the transmitter relative to the receiver for receiving the same coded signal as the decoding means and determining therefrom the position of the object with respect to the receiver.

2. A system according to claim 1 wheren each transmitter comprises a pulse-rate coded light source.

3. A system according to claim 2 wherein the decoding means includes a plurality of active filters each tuned to pass a different one of the frequencies of the pulse rate codes of the object, and means for converting a light signal from an object into an electrical code signal which is applied to the filters whereby that filter passing an electrical code signal serves to identify the object whose light signal is received.

4. A system according to claim 2 wherein the decoding means includes means for converting a light signal from an object into an electrical code signal in the form of a pulse train whose repetition rate is the code associated with an object, a counter for counting the pulses in the electrical code signal, and a clock connected to the counter for gating the code signal into the counter for a predetermined time interval so that the contents of the counter at the end of such interval represents the repetition rate of the pulse train and hence the code associated with an object whose light signal is received.

5. A system according to claim 4 wherein the decoding means includes a plurality of comparators each of which has two inputs, one input representing the contents of the counter and one input representing one of the codes associated with the objects whereby that comparator having an output serves to identify the object whose light signal is received.

6. A system according to claim 2 wherein said locating means includes a photodetector array with an aperture-mask.

7. A system according to claim 1 wherein the coded signal is a light signal.

8. A system according to claim 7 wherein the light is visible.

9. A system according to claim 7 wheren the light is ultraviolet.

10. A system according to claim 7 wherein the light is infrared.

* * * * *